United States Patent
Iwama

(10) Patent No.: US 12,358,456 B2
(45) Date of Patent: Jul. 15, 2025

(54) PASSENGER PROTECTING DEVICE OF VEHICLE WITH TABLE

(71) Applicant: TOYOTA JIDOSHA KABUSHIKI KAISHA, Aichi-ken (JP)

(72) Inventor: Toshiki Iwama, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/751,346

(22) Filed: Jun. 24, 2024

(65) Prior Publication Data

US 2025/0026297 A1   Jan. 23, 2025

(30) Foreign Application Priority Data

Jul. 18, 2023   (JP) .................. 2023-117119

(51) Int. Cl.
  *B60N 3/00*   (2006.01)
  *B60R 21/21*   (2011.01)
  *B60R 21/231*   (2011.01)

(52) U.S. Cl.
  CPC .............. *B60R 21/21* (2013.01); *B60N 3/001* (2013.01); *B60R 2021/23153* (2013.01)

(58) Field of Classification Search
  CPC .......... B60R 21/21; B60R 2021/23153; B60N 3/001
  USPC ...................................................... 280/733
  See application file for complete search history.

(56) References Cited

U.S. PATENT DOCUMENTS

| | | | | |
|---|---|---|---|---|
| 2,322,755 | A * | 6/1943 | Voorhies | B60R 21/02 280/751 |
| 3,985,374 | A * | 10/1976 | Powaska | B60N 3/004 248/240.4 |
| 10,232,815 | B1* | 3/2019 | Dry | B60R 21/18 |
| 10,875,550 | B2* | 12/2020 | Le Corre | B60N 3/001 |
| 11,273,785 | B1* | 3/2022 | Faruque | B60R 21/01554 |
| 11,590,914 | B1* | 2/2023 | Llamazares Domper | B60N 2/06 |
| 11,813,999 | B2* | 11/2023 | Matsuzaki | B60R 21/26 |
| 11,958,427 | B2* | 4/2024 | Jung | B60R 21/18 |
| 11,993,219 | B2* | 5/2024 | Fischer | B60R 21/2338 |
| 12,012,075 | B1* | 6/2024 | Faruque | A61G 3/0808 |
| 2019/0291680 | A1* | 9/2019 | Baccouche | B60R 21/213 |
| 2020/0023801 | A1 | 1/2020 | Takemura et al. | |
| 2020/0114939 | A1* | 4/2020 | Le Corre | B60N 3/001 |
| 2022/0203923 | A1* | 6/2022 | Jaradi | B60R 21/214 |
| 2022/0242353 | A1* | 8/2022 | Binder | B60N 3/001 |
| 2023/0125485 | A1* | 4/2023 | Nakamura | B60R 7/04 296/24.33 |
| 2023/0331182 | A1* | 10/2023 | Ohno | B60R 21/055 |
| 2024/0083321 | A1* | 3/2024 | Thomas | B60N 2/77 |

FOREIGN PATENT DOCUMENTS

| | | |
|---|---|---|
| JP | 2021-070389 A | 5/2021 |
| JP | 2021-084491 A | 6/2021 |
| JP | 2021-088223 A | 6/2021 |
| WO | 2018/167899 A1 | 9/2018 |

* cited by examiner

*Primary Examiner* — Toan C To
(74) *Attorney, Agent, or Firm* — HAUPTMAN HAM, LLP

(57) ABSTRACT

A passenger protecting device of a vehicle with a table, that includes: a vehicle seat provided at a floor of a vehicle cabin; and a table provided at a vehicle front side of the vehicle seat, and having a tabletop structured so as to be able to slide toward a vehicle front side at a time of a front collision of a vehicle.

9 Claims, 8 Drawing Sheets

PASSENGER PROTECTING DEVICE OF VEHICLE WITH TABLE

CROSS-REFERENCE TO RELATED APPLICATION

This application is based on and claims priority under 35 USC 119 from Japanese Patent Application No. 2023-117119 filed on Jul. 18, 2023, the disclosure of which is incorporated by reference herein.

BACKGROUND

Technical Field

The present disclosure relates to a passenger protecting device of a vehicle with a table.

Related Art

In a vehicle in which a floor-mounted table is set centrally between facing seats, a structure in which, at the time of a front collision of the vehicle, an airbag protrudes from the lower surface side of the tabletop of the table toward a passenger seated in a seat, is conventionally known (see, for example, Japanese Patent Application Laid-Open (JP-A) No. 2021-070389).

However, if the distance between the passenger seated in the seat and the tabletop of the table is too close, there is the concern that, at the time of a front collision of the vehicle, the head of the passenger who moves toward the vehicle front side due to inertial force will hit the tabletop of the table and be injured. Further, there is also the concern that the tabletop of the table will impede the inflation and expansion of the airbag.

SUMMARY

An aspect of the present disclosure is a passenger protecting device of a vehicle with a table, that includes: a vehicle seat provided at a floor of a vehicle cabin; and a table provided at a vehicle front side of the vehicle seat, and having a tabletop structured so as to be able to slide toward a vehicle front side at a time of a front collision of a vehicle.

DETAILED DESCRIPTION

Embodiments relating to the present disclosure are described in detail hereinafter with reference to the drawings. Note that, for convenience of explanation, arrow UP that is illustrated appropriately in the respective drawings indicates the upward direction of a vehicle and a vehicle seat, arrow FR indicates the forward direction of the vehicle and the vehicle seat, and arrow RH indicates the rightward direction of the vehicle and the vehicle seat. Accordingly, in the following description, when vertical, front-rear, and left-right directions are described, they mean the vertical, the front-rear, and the left-right of the vehicle and the vehicle seat unless otherwise specified. Further, the left-right direction has the same meaning as the vehicle transverse direction and the seat transverse direction.

First Embodiment

Figure 1:
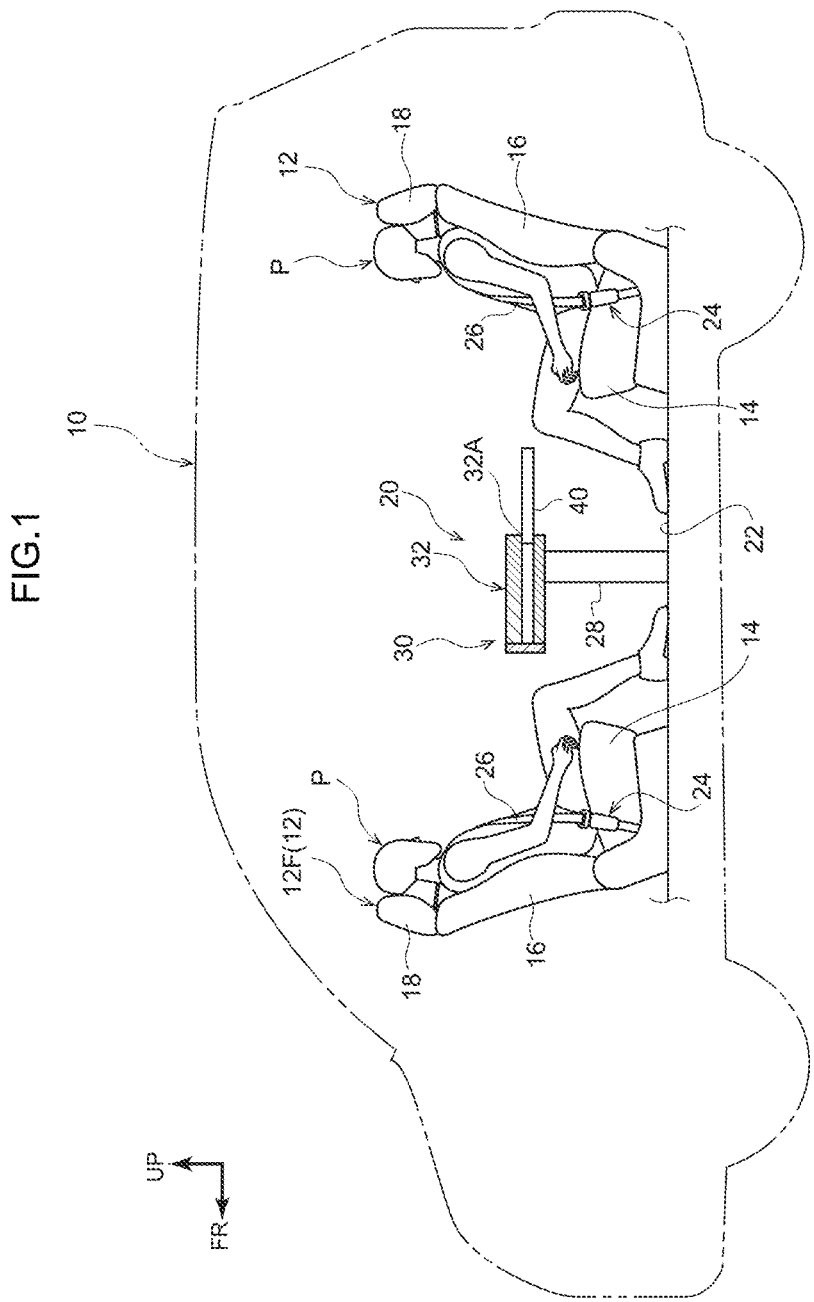
FIG. 1 is a schematic side view illustrating a vehicle with a table that is equipped with a passenger protecting device relating to a first embodiment.

First, a first embodiment is described. As illustrated in FIG. 1, passenger protecting device 20 relating to the first embodiment is structured to include vehicle seats 12 and a table 30 that are provided at a floor 22 of a vehicle cabin of an automatic driving vehicle 10 (hereinafter called "vehicle 10"). The table 30 is set on the floor 22 at the front side of the rear-side vehicle seat 12. The front-side vehicle seat 12 can face the rear-side vehicle seat 12 with the table 30 therebetween.

Each of the vehicle seats 12 has a seat cushion 14 on which a passenger sits (that supports the buttocks and thighs of the passenger), a seatback 16 that supports the back of the passenger and is provided at the rear side of the seat cushion 14 so as to be able to rotate with the seat transverse direction being the axial direction, and a headrest 18 that supports the head of the passenger and is provided at the upper end portion of the seatback 16 so as to be able to be raised and lowered. Note that, hereinafter, the front-side vehicle seat 12 is called "vehicle seat 12F" when differentiating from the rear-side vehicle seat 12.

Further, the respective drawings illustrate states in which a crash-test dummy (a human dummy) is seated on the seat cushion 14 of the vehicle seat 12 as a model of a passenger (a seated person) who is to be protected. The dummy is, for example, an AM50 (50th percentile U.S. adult male) that is a dummy for a front collision test (Hybrid III). The dummy is seated in the standard seated posture prescribed by the crash test method, and the vehicle seat 12 is positioned at the standard set position corresponding to the seated posture. Hereinafter, the dummy will be called "passenger P".

The passenger P seated on the seat cushion 14 of the vehicle seat 12 is restrained at the vehicle seat 12 by a seatbelt 26 of a seatbelt device 24. The seatbelt device 24 is a three-point seatbelt device, and is a seat-mounted seatbelt device in which a retractor, an anchor and a buckle are respectively provided at the vehicle seat 12.

As illustrated in FIG. 2A through FIG. 4B, the table 30 has a support 28 provided erect at the floor 22, a table main body 32 provided integrally with the top end portion of the support 28, and a tabletop 40 provided so as to be able to slide with respect to the table main body 32. Note that the "support 28 provided erect at the floor 22" also includes cases in which the support 28 is mounted to a supporting member provided at the lower side of the floor 22, and passes-through a through-hole formed in the floor 22, and stands erect.

The table main body 32 is formed in the shape of a case that is rectangular as seen in plan view and whose rear side is open. The table main body 32 has a bottom plate 34, a fixed tabletop 36, left and right side plates 35, and a front plate 38 that serves as a restrictor and is described later. The tabletop 40 is formed in the shape of a rectangular, flat plate of a size such that it can be accommodated within the table main body 32. At usual times, the tabletop 40 projects-out rearward from an opening portion 32A of the table main body 32. At the time of a front collision of the vehicle 10, the tabletop 40 can slide forward due to the inertial force of the impact of the collision.

Figure 3A:
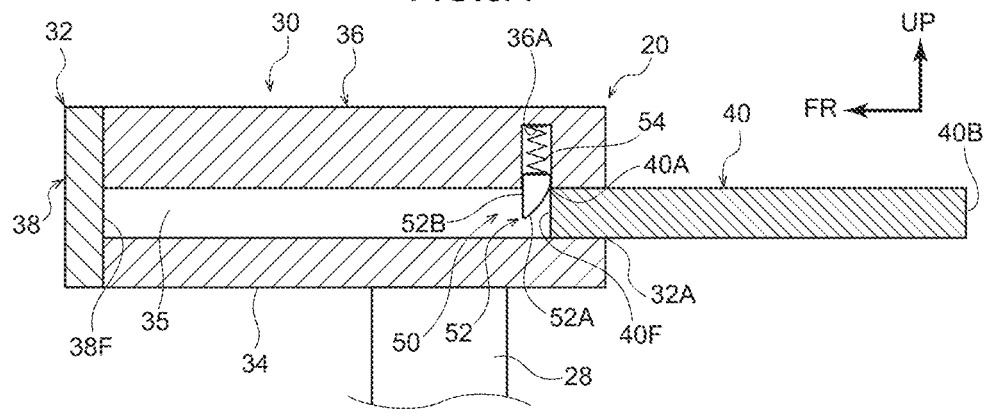
FIG. 3A is a schematic side view illustrating a sliding process of a tabletop of a table, at the time of a front collision of the vehicle, of the passenger protecting device relating to the first embodiment.
Figure 3B:
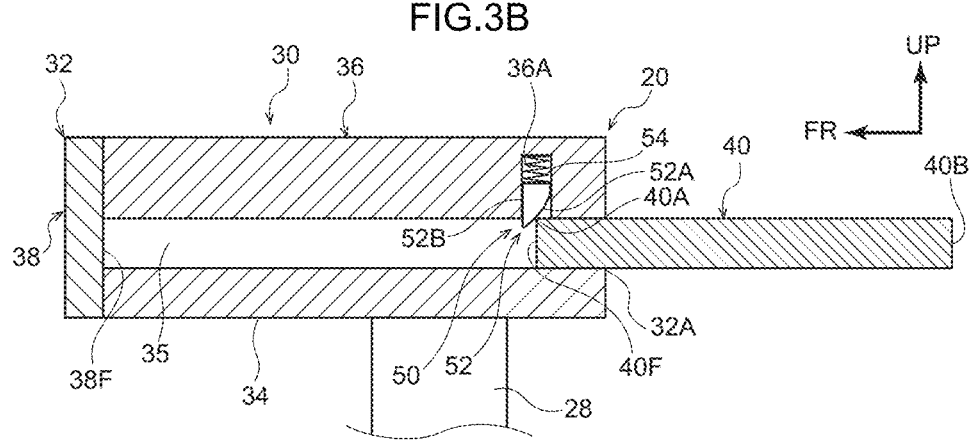
FIG. 3B is a schematic side view illustrating the sliding process of the tabletop of the table, at the time of a front collision of the vehicle, of the passenger protecting device relating to the first embodiment.
Figure 3C:
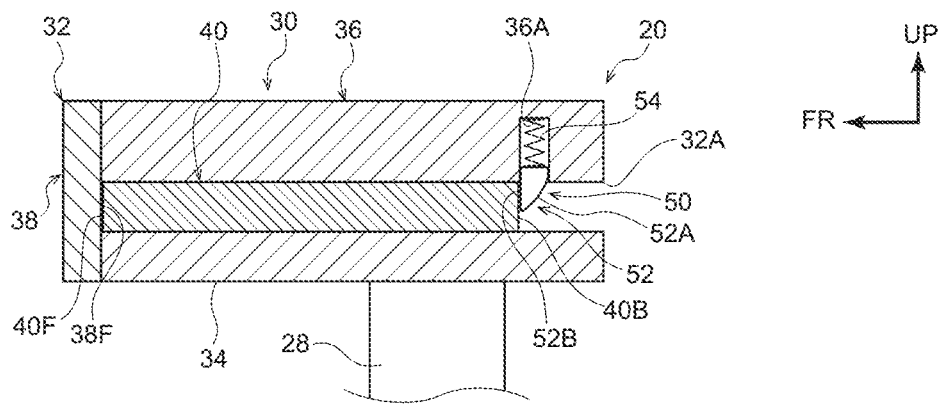
FIG. 3C is a schematic side view illustrating the sliding process of the tabletop of the table, at the time of a front collision of the vehicle, of the passenger protecting device relating to the first embodiment.

As illustrated in FIGS. 3A to 3C, an impeding mechanism 50 is provided at the left-right direction central portion of the rear portion side of the inner surface (the lower surface) of the fixed tabletop 36. The impeding mechanism 50 is structured by a stopper portion 52, and a compression coil spring 54 that serves as an urging member and urges the stopper portion 52 toward the lower side.

The compression coil spring 54 is accommodated in a hole portion 36A formed in the inner surface of the fixed tabletop 36. The stopper portion 52 is formed in the shape of substantially ¼ of a circle as seen in a side view, and can enter into and emerge from the hole portion 36A in a state in which a curved surface portion 52A faces rearward (a flat surface portion 52B faces frontward).

Due to a front upper edge portion 40A of the tabletop 40 abutting the curved surface portion 52A of the stopper portion 52, the state in which the tabletop 40 projects-out from the opening portion 32A toward the rear side is maintained (see FIG. 3A). Further, at the time of a front collision of the vehicle 10, the tabletop 40 slides toward the front side due to inertial force, and, at this time, the curved surface portion 52A of the stopper portion 52 is pushed forward by the front upper edge portion 40A.

Due thereto, the stopper portion 52 rises up against the urging force of the compression coil spring 54 and enters into the hole portion 36A, and sliding of the tabletop 40 toward the front side is permitted (see FIG. 3B). Note that, as will be described later, when a rear surface 40B of the tabletop 40 goes past the flat surface portion 52B of the stopper portion 52, the stopper portion 52 falls due to the urging force of the compression coil spring 54 and projects-out from the interior of the hole portion 36A (see FIG. 3C).

Further, due to front surface 40F of the tabletop 40 abutting inner surface (rear surface) 38F of the front plate 38, sliding of the tabletop 40 toward the front side is restricted. Namely, the front plate 38 is a restrictor that restricts sliding, of greater than or equal to a predetermined amount, of the tabletop 40 toward the front side. Further, as seen in a side view, the length of the tabletop 40 along the front-rear direction is formed to be the same as or shorter than the length from the inner surface 38F of the front plate 38 to the flat surface portion 52B of the stopper portion 52.

Accordingly, when the rear surface 40B of the tabletop 40 goes past the flat surface portion 52B of the stopper portion 52, the stopper portion 52 falls due to the urging force of the compression coil spring 54, and projects-out from the interior of the hole portion 36A. Due thereto, due to the rear surface 40B of the tabletop 40, which has slid forward (whose forward sliding is restricted by the front plate 38), abutting the flat surface portion 52B of the stopper portion 52, sliding of the tabletop 40 toward the rear side due to the rebound is impeded.

Figure 4A:
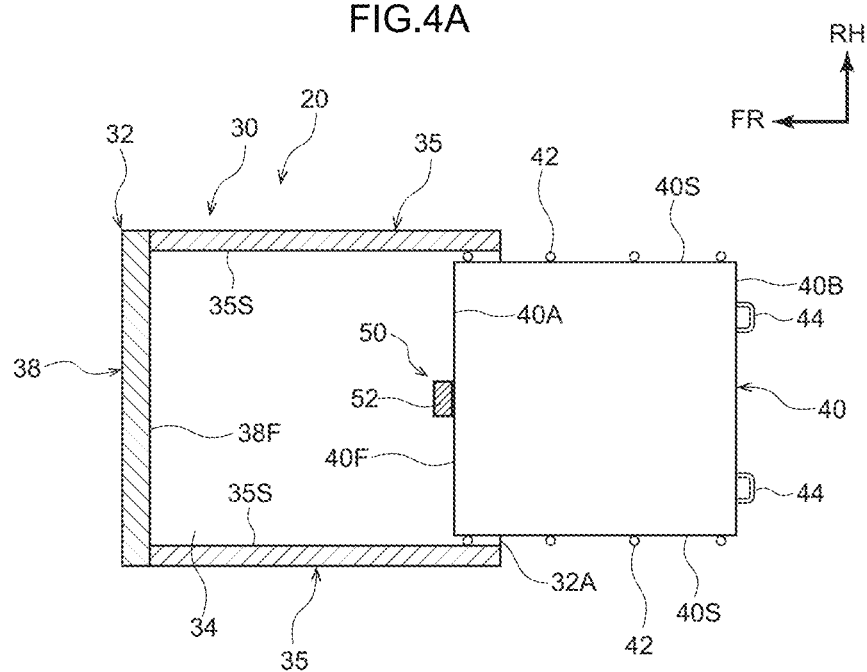
FIG. 4A is a schematic plan view illustrating, in a partial cross-section, the sliding process of the tabletop of the table, at the time of a front collision of the vehicle, of the passenger protecting device relating to the first embodiment.
Figure 4B:
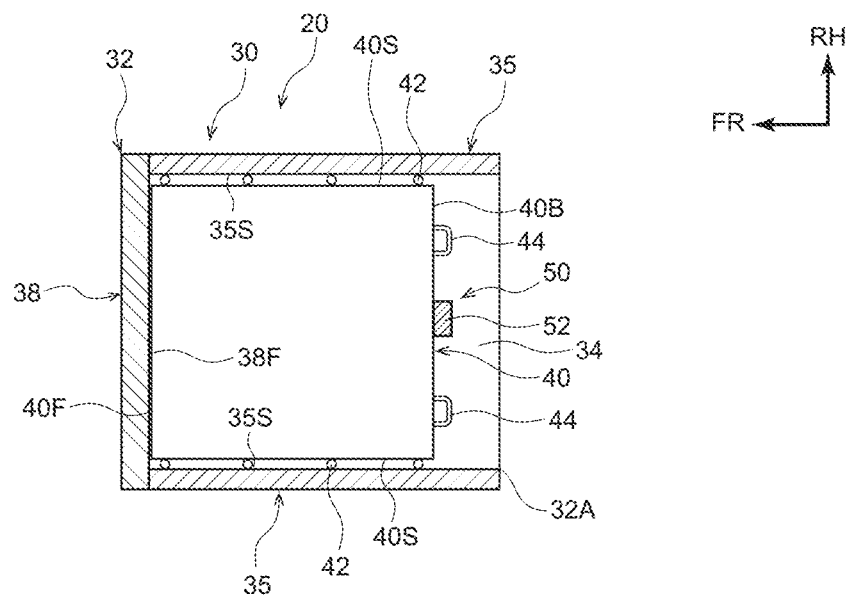
FIG. 4B is a schematic plan view illustrating, in a partial cross-section, the sliding process of the tabletop of the table, at the time of a front collision of the vehicle, of the passenger protecting device relating to the first embodiment.

Further, as illustrated in FIG. 4, plural rollers 42, whose rotational axis directions are the vertical direction, are mounted so as to be apart at a predetermined interval to left and right side surfaces 40S of the tabletop 40 so as to rotate freely. The tabletop 40 can slide smoothly due to the respective rollers 42 rolling along inner surfaces 35S of the left and right side plates 35. Further, grasped portions 44 that can be grasped by fingers are provided at the rear surface 40B of the tabletop 40.

The grasped portions 44 are, for example, formed in substantial "U" shapes as seen in a plan view of fabric materials, and are provided as a pair with an interval therebetween in the left-right direction. Due thereto, the grasped portions 44 can be grasped and the tabletop 40 can be pulled-out, while the stopper portion 52 is raised by fingers against the urging force of the compression coil spring 54. Namely, at usual times as well, the tabletop 40 can be housed in the interior of the table main body 32.

Figure 2A:
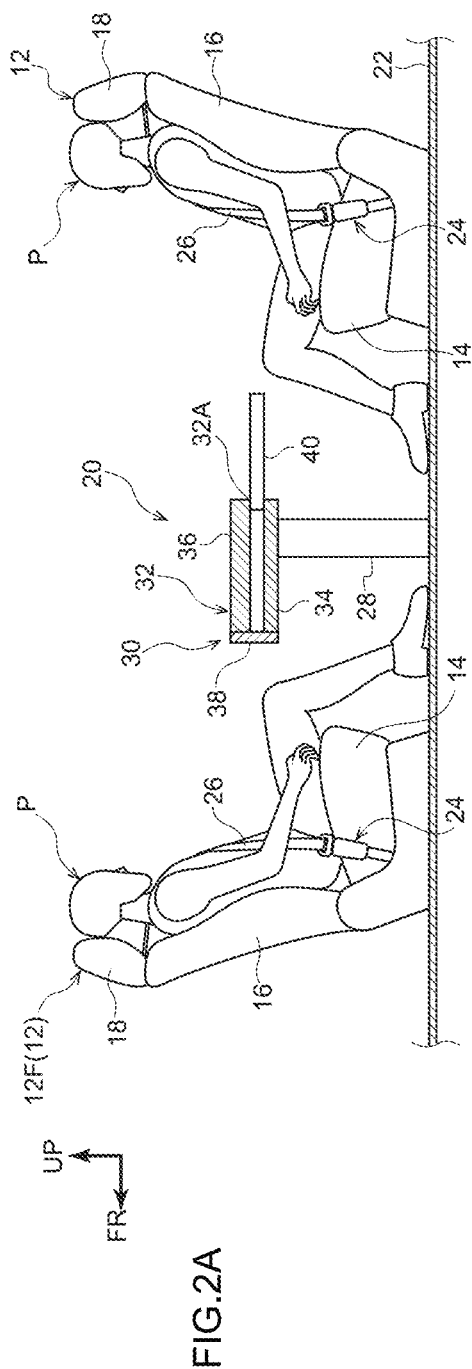
FIG. 2A is a schematic side view illustrating a state, at usual times, of the vehicle with a table that is equipped with the passenger protecting device relating to the first embodiment.
Figure 2B:
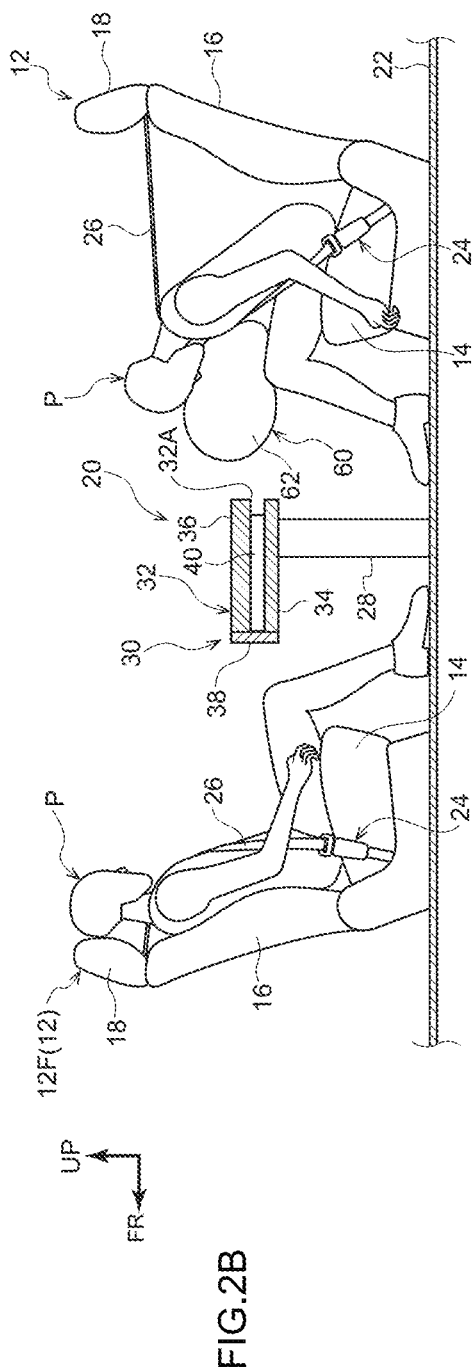
FIG. 2B is a schematic side view illustrating a state, at the time of a front collision, of the vehicle with a table that is equipped with the passenger protecting device relating to the first embodiment.

Further, as illustrated in FIG. 2B, an airbag device 60 is installed in a side door of the vehicle 10. The airbag device 60 has an airbag 62 that is in a folded-up state at usual times, and an inflator that instantaneously supplies gas to the airbag 62 at the time of a front collision of the vehicle 10. A control device (ECU) that controls the operation of the inflator is provided at the vehicle 10.

The control device is electrically connected to the inflator and a collision sensor, and is structured so as to be able to detect a front collision of the vehicle 10. When, on the basis of information from the collision sensor, the control device detects a front collision of the vehicle 10 (hereinafter called "at the time of a front collision"), the control device operates the inflator.

The inflator is a combustion-type or a cold-gas-type cylindrical inflator for example. At the time of a front collision of the vehicle 10, due to the inflator being operated by the control device, the inflator generates gas. Note that, in addition to full-overlap front collisions, offset front collisions such as oblique collisions and small overlap collisions and the like are included among the types of front collisions of the vehicle 10 in which the control device causes the inflator to operate.

Due to the inflation pressure that is due to gas being supplied from the inflator, the airbag 62 ruptures the door trim of the side door, and inflates and expands (expands and inflates) toward the front side of at least the head and the chest region of the passenger P seated in the vehicle seat 12. Note that a tear line serving as a fracture portion for rupturing is formed at the door trim, and the airbag 62 fractures this tear line and inflates and expands.

Further, the airbag 62 after inflation and expansion is formed to a size (height, width, thickness) such that it can restrain at least the head and the chest region of the passenger P who starts to move forward due to inertial force at the time of a front collision of the vehicle 10, and can compressively deform (see FIG. 2B) by being pressed by at least the head and the chest region of the passenger P. Note that the airbag 62 is formed in the shape of a bag due to two base cloths, which are formed of polyamide or polyester fabric materials for example, being superposed and the peripheral edge portions thereof being sewn together.

Operation at the passenger protecting device 20 of the vehicle 10 with the table 30 relating to the first embodiment that is structured as described above, is described next.

The table 30 is set at the floor 22 of the vehicle cabin, at the front side of the vehicle seat 12. The tabletop 40 projects-out toward the rear side (the passenger P side) from the opening portion 32A of the table main body 32 of the table 30. At the tabletop 40 that is in this state, the front upper edge portion 40A thereof merely abuts the curved surface portion 52A of the stopper portion 52, and the plural rollers 42 are provided at the side surfaces 40S.

Accordingly, the tabletop 40, which projects-out toward the passenger P side from the opening portion 32A of the table main body 32 of the table 30, slides forward due to the inertial force that is due to the impact at the time of a front collision of the vehicle 10. Because the distance between the tabletop 40 and the passenger P seated in the vehicle seat 12 is thereby increased, the head of the passenger P, who starts to move forward due to inertial force, can be prevented from hitting the tabletop 40 (the risk of the head of the passenger P being injured can be reduced or avoided).

Further, at the time of a front collision of the vehicle 10, the inflator operates due to control of the control device, and gas is jetted-out from the inflator. The gas that is jetted-out from the inflator is supplied to the airbag 62. Thereupon, the tear line formed in the door trim of the side door receives the expansion pressure of the airbag 62 and ruptures, and the airbag 62 inflates and expands toward at least the head and the chest region of the passenger P.

Here, the tabletop 40 of the table 30 has already slid toward the front side due to the inertial force at the time of the front collision of the vehicle 10. Accordingly, the airbag 62 can inflate and expand between the tabletop 40 that has slid forward (the table main body 32) and the passenger P seated in the vehicle seat 12.

In particular, because the airbag 62 is installed in the side door, the airbag 62 can rapidly and properly inflate and expand into the space that has been enlarged due to the tabletop 40 having slid forward. In other words, there is no concern that the airbag 62 will interfere with the tabletop 40 (there is no concern that the inflation and expansion will be hindered by the tabletop 40), and the airbag 62 can rapidly and properly inflate and expand at the front sides of at least the head and the chest region of the passenger P.

Due thereto, the airbag 62 can effectively receive the load from the passenger P who has moved forward due to the inertial force due to the impact at the time of the front collision of the vehicle 10. Moreover, the airbag 62 compressively deforms, and restrains not only the head of the passenger P, but the chest region as well. Therefore, there is no concern that retroflexion of the neck of the passenger P will be great, and the occurrence of brain damage due to centrifugal force can be suppressed or prevented.

In this way, in accordance with the first embodiment, even though the tabletop 40 of the table 30 that is set on the floor 22 is, at usual times, disposed at the front side of the passenger P seated in the vehicle seat 12, at the time of a front collision of the vehicle 10, the head of the passenger P who moves inertially can be prevented from hitting the tabletop 40, and moreover, at least the head and the chest region of the passenger P can be effectively and properly restrained by the airbag 62.

Because the tabletop 40 is structured so as to slide forward due to inertial force, the structure thereof is simplified as compared with a structure in which the tabletop 40 is slid by an electrically-powered mechanism for example. Further, the tabletop 40 is restricted so as to not slide forward by a greater than or equal to a predetermined amount, because the front plate 38 is provided at the table 30. Accordingly, as illustrated in FIG. 2B, the tabletop 40 that has slid forward can be prevented from hitting the passenger P who is seated in the vehicle seat 12F that is at the side facing the vehicle seat 12.

The tabletop 40, which has slid forward, sliding rearward due to the rebound is impeded by the impeding mechanism 50 (the stopper portion 52) provided at the table 30. Accordingly, for example, in the final stage of the collision at the time of a front collision of the vehicle 10 that is of an extent such that the airbag 62 does not inflate and expand, the occurrence of the problems of the tabletop 40 that has slid forward sliding rearward due to the rebound, and the head of the passenger P hitting the tabletop 40, also can be prevented.

Second Embodiment

A second embodiment is described next. Note that portions that are equivalent to those of the above-described first embodiment are denoted by the same reference numerals, and detailed description thereof (including description of common operations) is omitted as appropriate.

Figure 5:
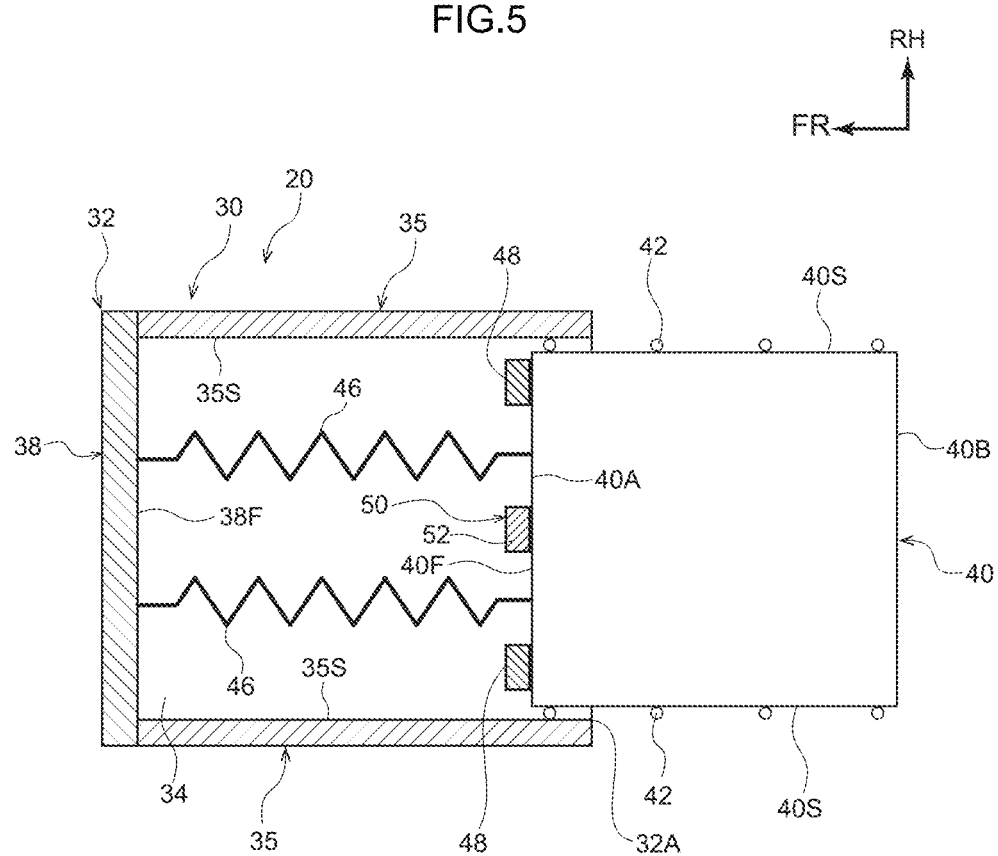
FIG. 5 is a schematic plan view illustrating, in a partial cross-section, the tabletop of the table of a passenger protecting device relating to a second embodiment.

As illustrated in FIG. 5, the second embodiment differs from the above-described first embodiment only with regard to the point that a pair of tension coil springs 46, which serve as urging members and urge the tabletop 40 toward the front side, are provided so as to be apart by a predetermined interval in the left-right direction and so as to span between the inner surface 38F of the front plate 38 of the table main body 32 and the front surface 40F of the tabletop 40, and the point that a pair of projecting portions 48, which impede the sliding of the tabletop 40 toward the front side, stand erect so as to be apart by a predetermined interval in the left-right direction at the rear portion side of the inner surface (the top surface) of the bottom plate 34.

The projecting portions 48 are, for example, formed in the shapes of flat plates and of a resin material, so as to be severed (broken) by the tabletop 40 that starts to move forward due to inertial force at the time of a front collision of the vehicle 10 that is of an extent such that the airbag 62 expands. Namely, the load that is inputted from the tabletop 40 to the projecting portions 48 is determined by the weight of the tabletop 40 and the acceleration at the time of the front collision of the vehicle 10. Therefore, the weight of the tabletop 40 and the shape and the strength of the projecting portions 48 are set (adjusted) such that the projecting portions 48 are broken by an input load of a level at which the airbag 62 expands (such that the projecting portions 48 are not broken by an input load of a level at which the airbag 62 does not expand).

Further, the urging force of the tension coil springs 46 is urging force of an extent that aids the sliding of the tabletop 40 due to inertial force, such that the tabletop 40 that has severed (broken) the projecting portions 48 slides forward reliably. Accordingly, the projecting portions 48 are not broken by the tabletop 40 that is pulled toward the front side by the urging forces of the tension coil springs 46. Note that the tension coil springs 46 are an example of the mechanical mechanism.

In accordance with the second embodiment that has such a structure, as described above, the tabletop 40 of the table 30 is structured so as to, at the time of a front collision of the vehicle 10, slide forward by severing the projecting portions 48 due to inertial force and by being pulled by the tension coil springs 46. Therefore, the structure thereof is simplified as compared with a structure in which the tabletop 40 is made to slide by an electrically-powered mechanism for example. Note that the shape of the projecting portions 48 is not limited to the illustrated flat plate shape, and it suffices for the projecting portions to be a shape that is such that they can be severed easily by the tabletop 40 that starts to slide forward due to the above-described inertial force.

Third Embodiment

A third embodiment is described next. Note that portions that are equivalent to those of the above-described first embodiment are denoted by the same reference numerals, and detailed description thereof (including description of common operations) is omitted as appropriate.

Figure 6A:
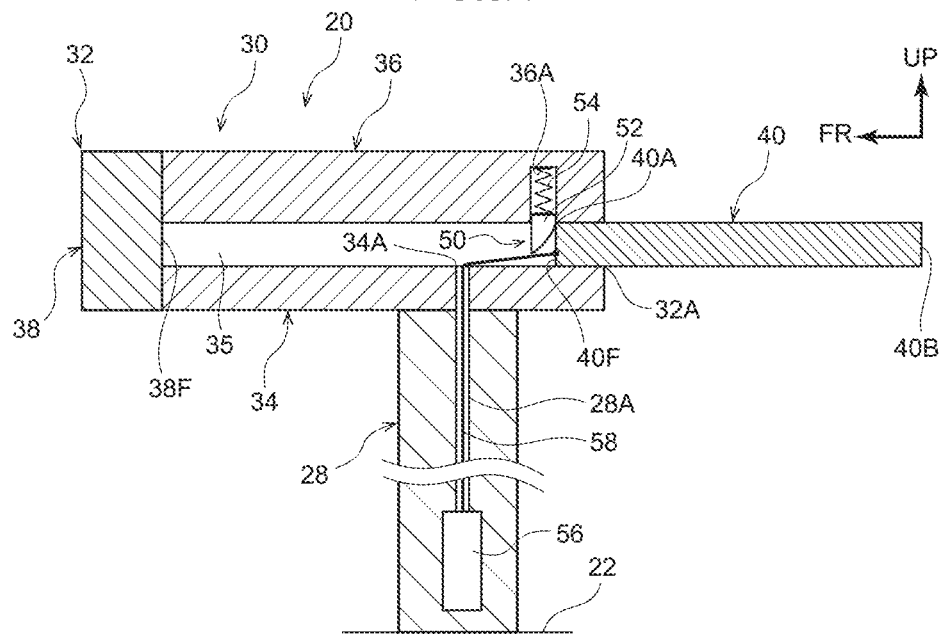
FIG. 6A is a schematic side view illustrating, in a partial cross-section, the tabletop of the table of a passenger protecting device relating to a third embodiment.
Figure 6B:
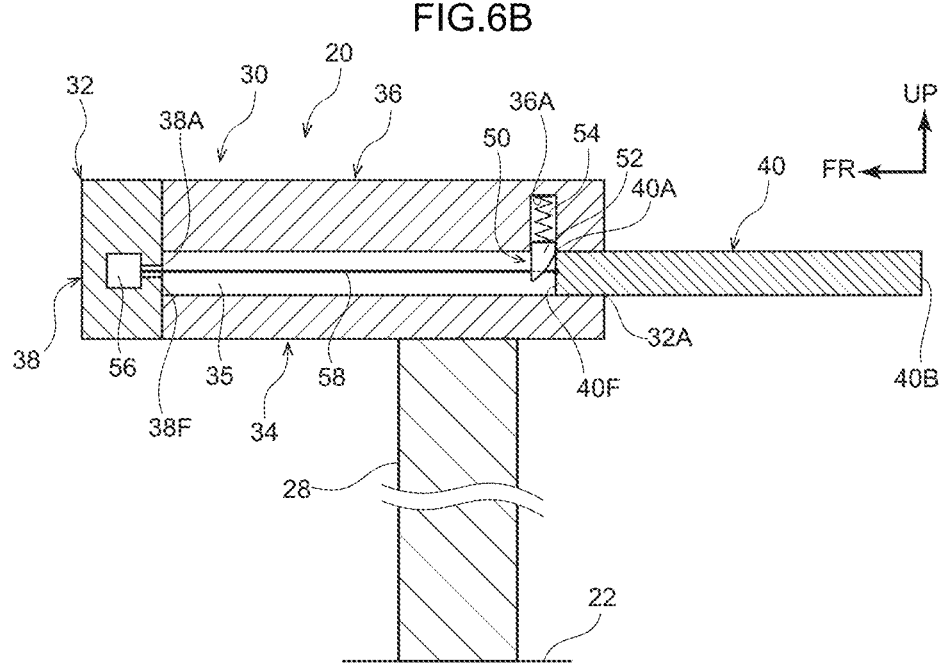
FIG. 6B is a schematic side view illustrating, in a partial cross-section, the tabletop of the table of a passenger protecting device relating to a modified example of the third embodiment.

As illustrated in FIGS. 6A and 6B, the third embodiment differs from the above-described first embodiment only with regard to the point that, at the time of a front collision of the vehicle 10, the tabletop 40 is forcibly slid forward by a known pretensioner mechanism 56 that serves as an example of the mechanical mechanism. More specifically, one end portion of a wire 58 is attached to the front surface 40F of the tabletop 40, and the another end portion of the wire 58 is connected to the pretensioner mechanism 56.

The pretensioner mechanism 56 has, for example, a gas generator that operates at the time of a front collision of the vehicle 10, and a pulling mechanism that pulls the wire 58 instantaneously due to this gas generator operating. For example, a structure that includes a rack and a pinion can be contemplated for the pulling mechanism.

Namely, the another end portion of the wire 58 is attached to the outer peripheral surface of a take-up roller, and the take-up roller rotates due to rotation of the pinion. Further, the rack, which meshes with the pinion, projects-out instantaneously due to operation of the gas generator.

In accordance with the third embodiment that has such a structure, at the time of a front collision of the vehicle 10, the take-up roller is rotated instantaneously via the rack and pinion due to operation of the gas generator. Therefore, the wire 58 can be taken-up and pulled instantaneously, and the tabletop 40 can forcibly and instantaneously be slid toward the front side.

Note that, as illustrated in FIG. 6A, the pretensioner mechanism 56 may be structured to as to be provided at the interior of the support 28 and slide the tabletop 40 forward by pulling the wire 58 toward the lower side. Or, as illustrated in FIG. 6B, the pretensioner mechanism 56 may be structured so as to be provided at the interior of the front plate 38 and slide the tabletop 40 forward by pulling the wire 58 toward either one of the left and right sides (toward the left side in the illustrated structure).

In a case in which the pretensioner mechanism 56 is provided within the support 28, a passageway 28A and a hole 34A through which the wire 58 passes are formed in the support 28 and the bottom plate 34, respectively, so as to communicate with one another. Further, in a case in which the pretensioner mechanism 56 is provided at the interior of the front plate 38, the front plate 38 is formed to be thick, and a passageway 38A through which the wire 58 passes is formed in the front plate 38.

Further, a control device in the third embodiment is electrically connected to a camera, and is structured so as to be able to predict (foresee) the inevitability of a front collision of the vehicle 10. Namely, on the basis of information from the collision sensor and the camera, the control device relating to the third embodiment operates the inflator and the pretensioner mechanism 56 not only when a front collision of the vehicle 10 is detected, but also when a front collision of the vehicle 10 is predicted. Note that times when a front collision of the vehicle 10 is predicted also are called "the time of a front collision".

Fourth Embodiment

A fourth embodiment is described next. Note that portions that are equivalent to those of the above-described first through third embodiments are denoted by the same reference numerals, and detailed description thereof (including description of common operations) is omitted as appropriate.

Figure 7A:
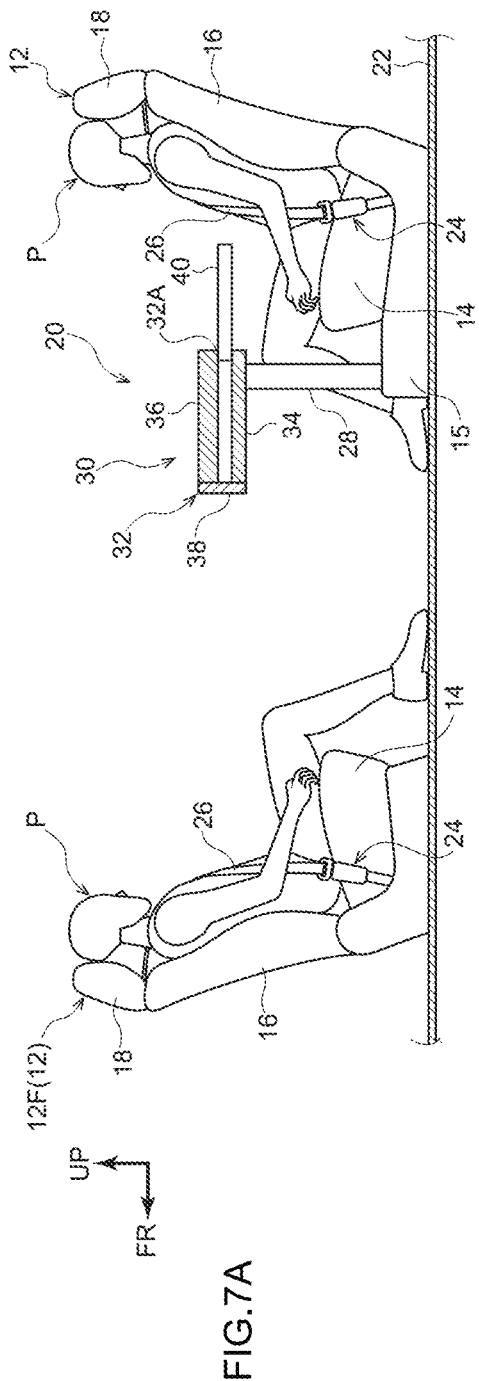
FIG. 7A is a schematic side view illustrating a state, at usual times, of the vehicle with a table that is equipped with a passenger protecting device relating to a fourth embodiment.
Figure 7B:
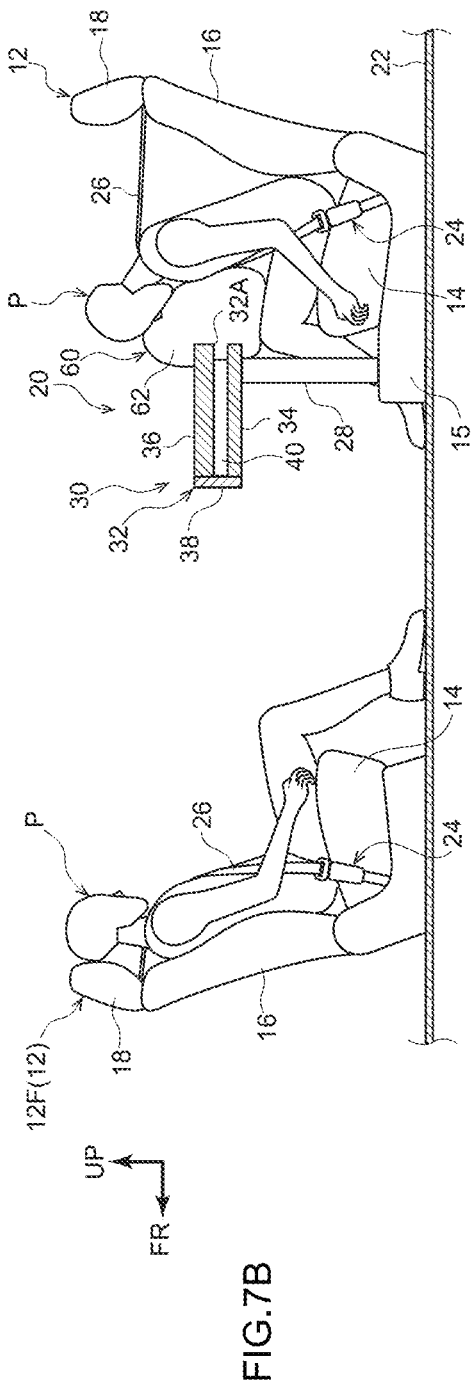
FIG. 7B is a schematic side view illustrating a state, at the time of a front collision, of the vehicle with a table that is equipped with the passenger protecting device relating to the fourth embodiment.

As illustrated in FIG. 7A and FIG. 7B, the fourth embodiment differs from the above-described first through third embodiments only with regard to the point that the table 30 is provided integrally with the vehicle seat 12 that is unable to slide in the front-rear direction. In detail, the support 28 of the table 30 stands erect at the front portion of a side portion 15 that is provided at a seat transverse direction outer side of the seat cushion 14 for example, of the vehicle seat 12.

In accordance with the fourth embodiment that has such a structure, at the time of a front collision of the vehicle 10, the tabletop 40 that projects-out toward the passenger P side slides toward the front side. Therefore, a space can be formed at the front side of at least the head and the chest region of the passenger P, and the airbag 62, which inflates and expands from the side door, can be disposed at the front side of at least the head and the chest region of the passenger P.

Fifth Embodiment

Finally, a fifth embodiment is described. Note that portions that are equivalent to those of the above-described fourth embodiment are denoted by the same reference numerals, and detailed description thereof (including description of common operations) is omitted as appropriate.

Figure 8A:
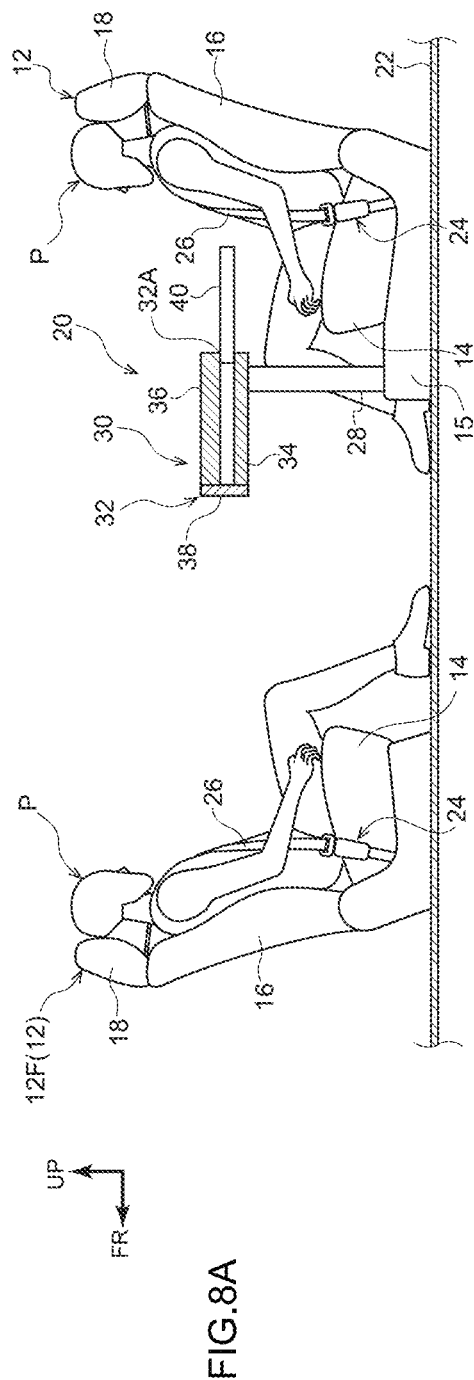
FIG. 8A is a schematic side view illustrating a state, at usual times, of the vehicle with a table that is equipped with a passenger protecting device relating to a fifth embodiment.
Figure 8B:
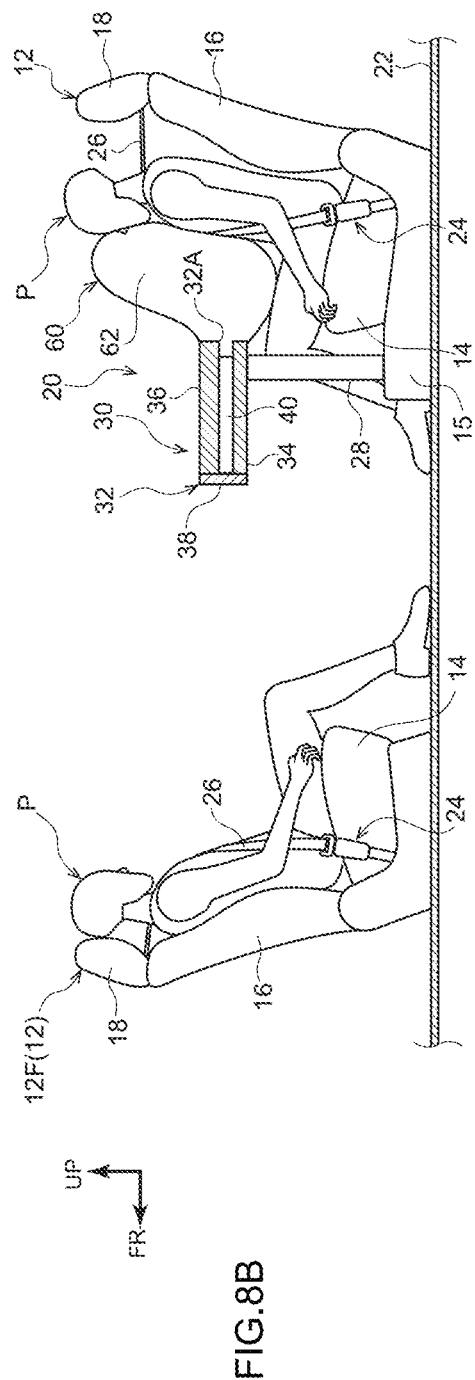
FIG. 8B is a schematic side view illustrating a state, at the time of a front collision, of the vehicle with a table that is equipped with the passenger protecting device relating to the fifth embodiment.

As illustrated in FIG. 8A and FIG. 8B, the fifth embodiment differs from the above-described fourth embodiment only with regard to the points that the airbag device 60 is installed in the table main body 32 of the table 30, and the vehicle seat 12 is structured so as to be able to slide in the front-rear direction. Specifically, the airbag device 60 is embedded in the rear portion side of the bottom plate 34 or the fixed tabletop 36.

In accordance with the fifth embodiment that has such a structure, at the time of a front collision of the vehicle 10, the tabletop 40 that projects-out toward the passenger P side slides forward. Therefore, a space can be formed at the front side of at least the head and the chest region of the passenger P, and the airbag 62, which inflates and expands from the table main body 32, can be disposed at the front side of at least the head and the chest region of the passenger P.

Further, the airbag device 60 is installed in the table main body 32 (the bottom plate 34 or the fixed tabletop 36) of the table 30 that slides in the front-rear direction integrally with the vehicle seat 12. Therefore, regardless of the front-rear position of the vehicle seat 12, the airbag 62 can rapidly and properly inflate and expand into the space that has been enlarged due to the tabletop 40 having slid toward the front side.

Although the passenger protecting device 20 of the vehicle 10 with the table 30 relating to the present embodiments has been be described above with reference to the drawings, the passenger protecting device 20 of the vehicle 10 with the table 30 relating to the present embodiments is not limited to the illustrated structures, and the design thereof can be changed appropriately within a scope that does not depart from the gist of the present disclosure. For example, the mechanical mechanism is not limited to the tension coil springs 46 and the pretensioner mechanism 56.

Further, the tabletop 40 is not limited to a structure that slides due to the plural rollers 42, which are provided at the side surfaces 40S, rolling along the inner surfaces 35S of the side plates 35 of the table main body 32. For example, there may be a structure in which the tabletop 40 slides due to fitting portions, which are provided at the side surfaces 40S of the tabletop 40, slidably fitting together with rails provided at the inner surfaces 35S of the side plates 35.

Further, the airbag device 60 (the airbag 62) is not limited to a structure that is installed in a side door or in the table main body 32 of the table 30, and may be installed in the vehicle seat 12, the ceiling of the vehicle cabin, the center console, or the seatbelt 26 (lap belt). In all of these cases, the airbag 62 is inflated and expanded in the space that is enlarged due to the tabletop 40 having slid forward, and therefore, becomes the airbag 62 of a shape such as those illustrated in FIG. 2B and FIG. 7B. In this way, in the present embodiments, there are many options for regions for installation of the airbag device 60, and the degrees of freedom in design also are high.

Further, among the fourth embodiment and the fifth embodiment, in at least the fourth embodiment, the front plate 38 does not have to be provided at the table main body 32. In particular, in a case in which the table 30 is provided at the vehicle seat 12 that is structured so as to be unable to slide, the table main body 32 is sufficiently apart from the passenger P who is seated in the vehicle seat 12F that is at the side facing the vehicle seat 12. Therefore, even if the front plate 38 is not provided at the table main body 32, the tabletop 40 that has slid forward does not hit the passenger P seated in the vehicle seat 12F.

An object of the present disclosure is to provide a passenger protecting device of a vehicle with a table that, at the time of a front collision of the vehicle, can prevent the head of a passenger, who moves toward the vehicle front side due to inertial force, from hitting the tabletop of the table.

A first aspect of the present disclosure is a passenger protecting device of a vehicle with a table, that includes: a vehicle seat provided at a floor of a vehicle cabin; and a table provided at a vehicle front side of the vehicle seat, and having a tabletop structured so as to be able to slide toward a vehicle front side at a time of a front collision of a vehicle.

In accordance with the disclosure of the first aspect, at the time of a front collision of the vehicle, the tabletop of the table, which is provided at the vehicle front side of the vehicle seat, slides toward the vehicle front side. Due thereto, the distance between the tabletop and the passenger seated in the vehicle seat increases, and the head of the passenger, who starts to move toward the vehicle front side due to inertial force, is prevented from hitting the tabletop.

A second aspect of the present disclosure is the passenger protecting device of a vehicle with a table of the first aspect, wherein the tabletop is structured so as to slide toward the vehicle front side due to inertial force or action of a mechanical mechanism.

In accordance with the disclosure of the second aspect, the tabletop is structured so as to slide toward the vehicle front side due to inertial force or a mechanical mechanism. Accordingly, the structure can be simplified as compared with a structure in which the tabletop is slid by an electrically-powered mechanism for example.

A third aspect of the present disclosure is the passenger protecting device of a vehicle with a table of the first or the second aspect, wherein the table: is provided at the floor or at the vehicle seat, and has an impeding mechanism that impedes the tabletop, in a case in which the tabletop has slid toward the vehicle front side, sliding toward a vehicle rear side due to rebound.

In accordance with the disclosure of the third aspect, the tabletop, which has slid toward the vehicle front side, sliding toward the vehicle rear side due to the rebound is impeded by the impeding mechanism that is provided at the table. Accordingly, even in the latter stage of a collision, the head of the passenger hitting the tabletop is prevented.

A fourth aspect of the present disclosure is the passenger protecting device of a vehicle with a table of the first or the second aspect, wherein the table: is provided at the floor, and has a restrictor that restricts the tabletop such that the tabletop does not slide toward the vehicle front side by greater than or equal to a predetermined amount.

In accordance with the disclosure of the fourth aspect, the tabletop is restricted so as to not slide toward the vehicle front side by greater than or equal to a predetermined amount, by the restrictor that is provided at the table. Accordingly, the tabletop, which has slid toward the vehicle front side, is prevented from hitting the passenger who is seated in the vehicle seat that is at the side facing the vehicle seat.

A fifth aspect of the present disclosure is the passenger protecting device of a vehicle with a table of the first of the second aspect, that further includes an airbag that inflates and expands between the tabletop, which has slid toward the vehicle front side, and a passenger seated in the vehicle seat.

In accordance with the disclosure of the fifth aspect, the airbag inflates and expands between the tabletop, which has slid toward the vehicle front side, and the passenger seated in the vehicle seat. Namely, the airbag is inflated and expanded in the space that has been enlarged due to the tabletop having slid toward the vehicle front side. Accordingly, there is no concern that the tabletop will impede the inflation and expansion of the airbag, and the passenger is restrained effectively.

A sixth aspect of the present disclosure is the passenger protecting device of a vehicle with a table of the fifth aspect, wherein the airbag is structured so as to be able to restrain at least a head and a chest region of the passenger.

In accordance with the disclosure of the sixth aspect, the airbag restrains at least the head and the chest region of the passenger. Namely, the airbag restrains not only the head of the passenger, but also his/her chest region as well. Accordingly, there is no concern that retroflexion of the neck of the passenger will be great.

A seventh aspect of the present disclosure is the passenger protecting device of a vehicle with a table of the fifth aspect, wherein the airbag is installed at a side door, the table, the vehicle seat, a ceiling of the vehicle cabin, a center console, or a seatbelt.

In accordance with the disclosure of the seventh aspect, the airbag is installed in a side door, the table, the vehicle seat, the ceiling of the vehicle cabin, the center console, or the seatbelt. Accordingly, the airbag is properly inflated and expanded in the space that has been enlarged due to the tabletop having slid toward the vehicle front side.

As described above, in accordance with the present disclosure, at the time of a front collision of a vehicle, the head of a passenger, who moves toward the vehicle front side due to inertial force, can be prevented from hitting the tabletop of a table.

What is claimed is:

1. A passenger protecting device of a vehicle with a table, comprising:
   a vehicle seat provided at a floor of a vehicle cabin; and
   a table provided at a vehicle front side of the vehicle seat, and having a tabletop structured so as to be able to slide toward a vehicle front side at a time of a front collision of a vehicle, wherein
   the table:
      is provided at the floor or at the vehicle seat, and
      has an impeding mechanism that impedes the tabletop, in a case in which the tabletop has slid toward the vehicle front side, sliding toward a vehicle rear side due to rebound.

2. The passenger protecting device of a vehicle with a table of claim 1, wherein the tabletop is structured so as to slide toward the vehicle front side due to inertial force or action of a mechanical mechanism.

3. The passenger protecting device of claim 2, wherein the mechanical mechanism is a tension coil spring or a pretensioner.

4. The passenger protecting device of claim 1, further comprising:
   an airbag that inflates and expands between the tabletop, which has slid toward the vehicle front side, and a passenger seated in the vehicle seat.

5. The passenger protecting device of claim 4, wherein the airbag is structured so as to be able to restrain at least a head and a chest region of the passenger.

6. The passenger protecting device of claim 4, wherein the airbag is installed at a side door, the table, the vehicle seat, a ceiling of the vehicle cabin, a center console, or a seatbelt.

7. The passenger protecting device of claim 1, wherein the impeding mechanism is structured by a stopper and a compression coil spring.

8. A passenger protecting device of a vehicle with a table, comprising:
   a vehicle seat provided at a floor of a vehicle cabin; and
   a table provided at a vehicle front side of the vehicle seat, and having a tabletop structured so as to be able to slide toward a vehicle front side at a time of a front collision of a vehicle, wherein
   the table:
      is provided at the floor, and
      has a restrictor that restricts the tabletop such that the tabletop does not slide toward the vehicle front side by greater than or equal to a predetermined amount.

9. The passenger protecting device of claim 8, wherein the restrictor is a front plate.

* * * * *